No. 667,595.  
F. W. SPACKE.  
AUTOMATIC STOP FOR GOVERNORS.  
(Application filed Apr. 30, 1900.)  
Patented Feb. 5, 1901.
(No Model.) 2 Sheets—Sheet 1.
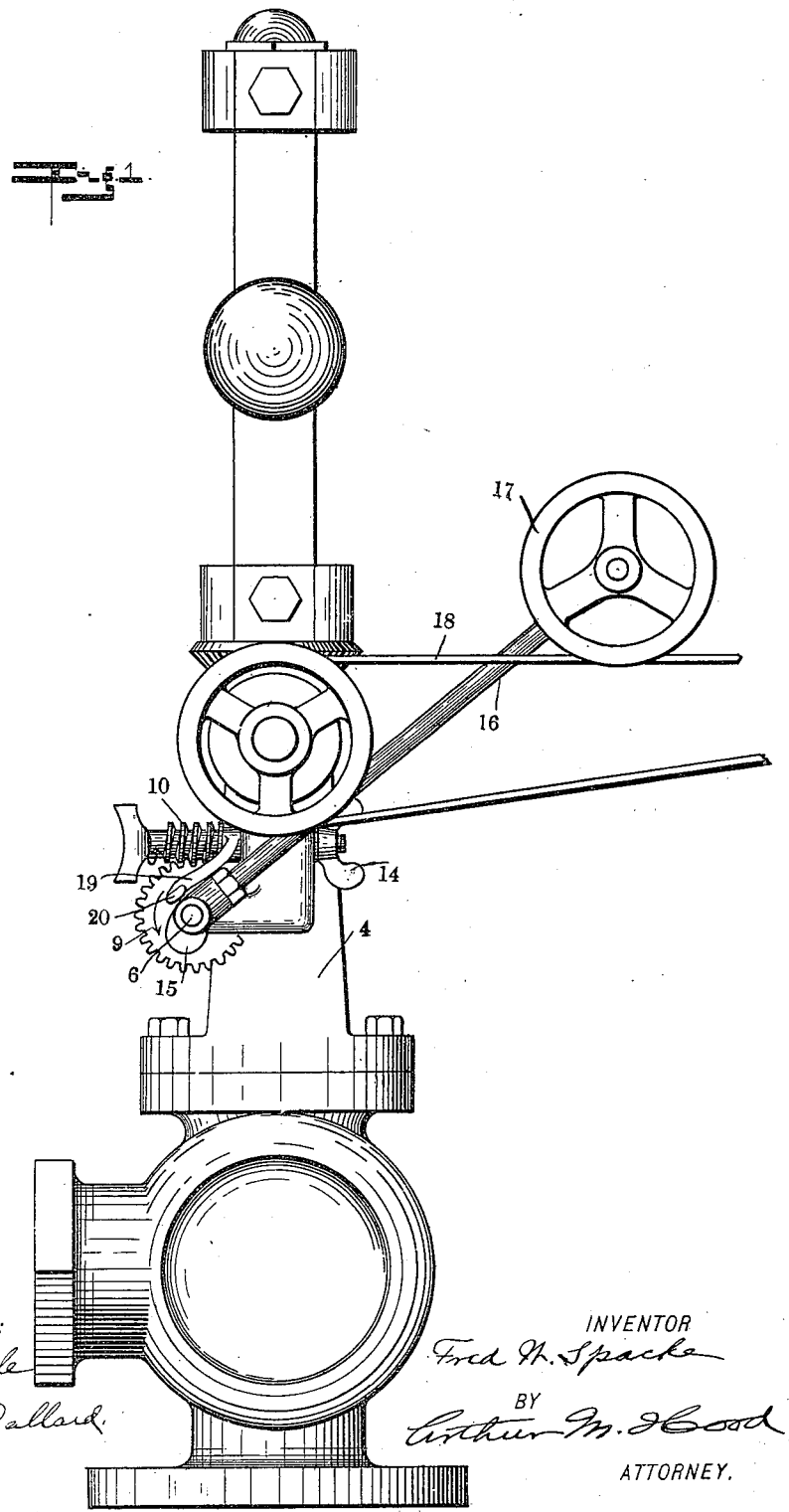

No. 667,595. Patented Feb. 5, 1901.
F. W. SPACKE.
AUTOMATIC STOP FOR GOVERNORS.
(Application filed Apr. 30, 1900.)
(No Model.) 2 Sheets—Sheet 2.
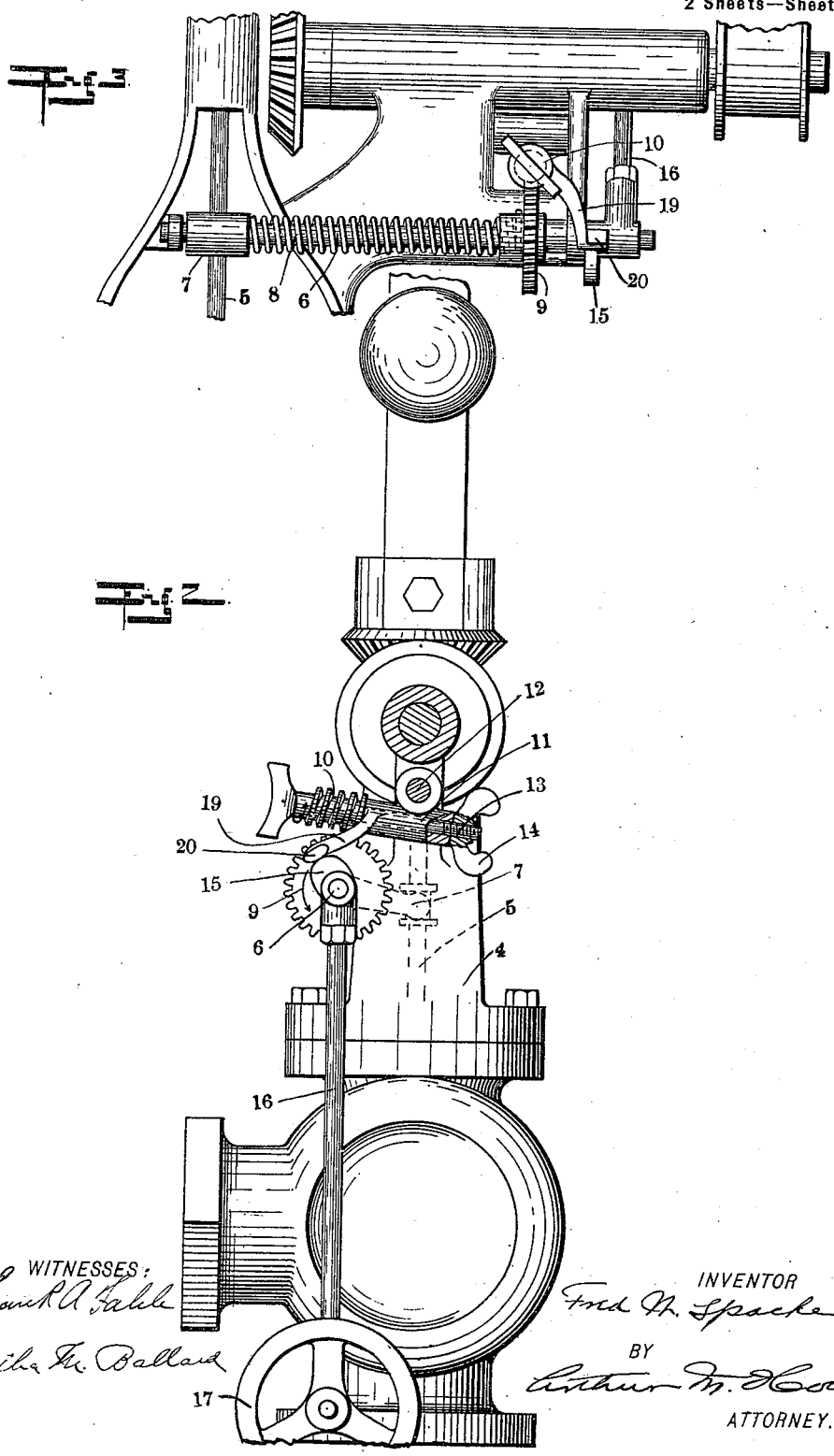
WITNESSES: INVENTOR
Fred W. Spacke
BY
ATTORNEY.

UNITED STATES PATENT OFFICE.

FRED W. SPACKE, OF INDIANAPOLIS, INDIANA.

AUTOMATIC STOP FOR GOVERNORS.

SPECIFICATION forming part of Letters Patent No. 667,595, dated February 5, 1901.

Application filed April 30, 1900. Serial No. 14,817. (No model.)

*To all whom it may concern:*

Be it known that I, FRED W. SPACKE, a citizen of the United States, residing at Indianapolis, in the county of Marion and State of Indiana, have invented a new and useful Automatic Stop for Governors, of which the following is a specification.

My invention relates to an improvement in automatic stops for engine-governors.

The object of my invention is to produce a simple but efficient means for automatically closing the valve in case of breakage of the driving-belt.

The accompanying drawings illustrate my invention.

Figure 1 is a side elevation of a governor in normal position. Fig. 2 is a similar view, partly in section and showing the position of the parts in case of breakage of the driving-belt. Fig. 3 is a front elevation of a portion.

In the drawings, 4 indicates a throttling-governor of any well-known form and provided with the usual valve-stem 5, which carries at its lower end the usual throttling-valve. Mounted on the framework in suitable bearings is a rock-shaft 6, to which is secured an arm 7, the outer end of which is connected to the stem 5 in any usual manner. Stem 5 is normally held in its upper position, so as to hold the valve open, by means of the torsional spring 8, which encircles shaft 6. One end of the spring 8 is secured to arm 7 and the other end is secured to a worm-gear 9, which may be turned so as to adjust the tension of spring 8 by means of the worm 10. Worm 10 is journaled in the bearing 11, which in turn is pivotally mounted upon an axis 12, transverse to the axis of worm 10. The shaft 13 of worm 10 extends through bearing 11 and is threaded at its outer end, so as to receive a thumb-nut 14. Pivotally mounted upon shaft 6 is a cam 15, to which is secured an arm 16. Upon the outer end of arm 16 is journaled the usual idler 17, adapted to engage and be supported by the usual driving-belt 18. Extending from bearing 11 is an arm 19, provided at its outer end with a finger 20, which when worm 10 is in engagement with gear 9 lies in the path of movement of cam 15.

The operation is as follows: Under normal conditions worm 10 lies in engagement with gear 9, and by turning said worm in the direction indicated by the arrow gear 9 may be turned in the direction indicated and the tension of spring 8 properly adjusted, said tension being sufficient to raise stem 5 and open the valve. Worm 10 will remain in engagement with the gear when said gear has been wound in the direction indicated, because the axis of said worm passes between the center of gear 9 and the axis 12. Under working conditions the idler 17 is supported by belt 18, so as to maintain cam 15 out of engagement with finger 20. As soon as the belt 18 breaks idler 17 will drop, thus bringing cam 15 into engagement with finger 20, and thereby swinging worm 10 as a whole about axis 12, so as to withdraw said worm from engagement with gear 9. As soon as this occurs the tension of spring 8 is released and valve-stem 5 will drop, so as to close the valve. By the use of the worm and worm-gear the tension of spring 8 may be adjusted to a nicety and when so adjusted may be maintained by setting up nut 14 against bearing 11, thus drawing the end of the worm against said bearing and preventing said worm from rotating on account of jarring of the machine.

I claim as my invention—

1. In an automatic stop for governors, the combination with the valve-controlling spring and gear secured thereto, of a pivotal support for said worm whereby the axis of the worm will lie between said pivot and the axis of the gear, a cam adapted to engage said support, and means supported by the driving-belt for operating said cam so as to swing said pivotal support to withdraw the worm from engagement with the gear.

2. In a governor, the combination with the valve-controlling spring and gear secured thereto, of an adjusting-worm arranged to engage said gear and provided with a shaft extending through its bearing, and a nut mounted upon the threaded projecting end of said shaft and adapted to engage the end of the bearing and thereby clamp the worm in position.

3. In an automatic stop for governors, the combination with the valve-controlling spring and gear secured thereto, a bearing for the shaft of said worm, a pivotal support for said bearing upon the side opposite from the gear, a nut mounted upon the threaded projecting end of the worm-shaft and adapted to engage said bearing, a cam arranged to be thrown into engagement with said bearing, and means supported by the driving-belt for throwing said cam into engagement with said bearing.

FRED W. SPACKE.

Witnesses:
ARTHUR M. HOOD,
FRANK A. FAHLE.